United States Patent [19]
Hopkins

[11] Patent Number: 5,622,345
[45] Date of Patent: Apr. 22, 1997

[54] CHAIR CARRIER CLAMPS

[76] Inventor: Mark A. Hopkins, 4708 NE 138th Ct., Vancouver, Wash. 98682

[21] Appl. No.: 611,283

[22] Filed: Mar. 6, 1996

Related U.S. Application Data

[63] Continuation of Ser. No. 260,263, Jun. 14, 1994, abandoned.

[51] Int. Cl.[6] .................................................. A47B 96/06
[52] U.S. Cl. ................... 248/230.5; 248/316.5; 248/231.51
[58] Field of Search ........................ 248/229.1, 316.5, 248/309.1, 231.51, 210, 211, 230.5, 238, 219; 224/42.45 R, 42.03 B, 42.03 R, 42.07, 42.08; 211/124, 193, 207, 107; 182/204; 292/341.15, 150

[56] References Cited

U.S. PATENT DOCUMENTS

| | | | |
|---|---|---|---|
| 1,956,388 | 4/1934 | Kalina | 292/150 |
| 2,581,782 | 1/1952 | Anderson | 182/204 |
| 2,759,695 | 8/1956 | Bonner | 248/219.4 |
| 3,223,467 | 7/1963 | Tafelice | 248/219.4 |
| 3,476,342 | 11/1969 | Motl | 248/188 |
| 3,848,838 | 11/1974 | Thomas | 248/42 |
| 3,877,622 | 4/1975 | McLain | 224/42.03 B |
| 3,904,161 | 9/1975 | Scott | 248/43 |
| 4,078,708 | 3/1978 | Mayer | 224/29 R |
| 4,290,529 | 9/1981 | Jones | 248/219.4 |
| 4,297,069 | 10/1981 | Worthington | 414/462 |
| 4,676,413 | 6/1987 | Began et al. | 224/42.03 B |
| 4,909,463 | 3/1990 | Zvannt | 248/219.4 |
| 4,967,942 | 11/1990 | McGruder | 224/42.03 R |
| 5,305,978 | 4/1994 | Current | 248/230 |
| 5,354,030 | 10/1994 | Harwood | 248/316.1 |
| 5,372,287 | 12/1994 | Deguevara | 224/42.03 B |

Primary Examiner—Korie Chan
Assistant Examiner—Gwendolyn W. Baxter

[57] ABSTRACT

Clamps for attaching elongated objects, such as chairs, ski poles, fishing rods, and the like, to the vertical supports of a vehicle ladder. The inventive device includes a mounting assembly which receives the vertical support, with an elongated lower clamp arm extending orthogonally from the mounting assembly. An elongated upper clamp arm is pivotally coupled to the mounting assembly for latching engagement to the lower arm. The arms include elongated channels which facilitate a reception of the chair legs or other elongated objects therebetween.

7 Claims, 3 Drawing Sheets

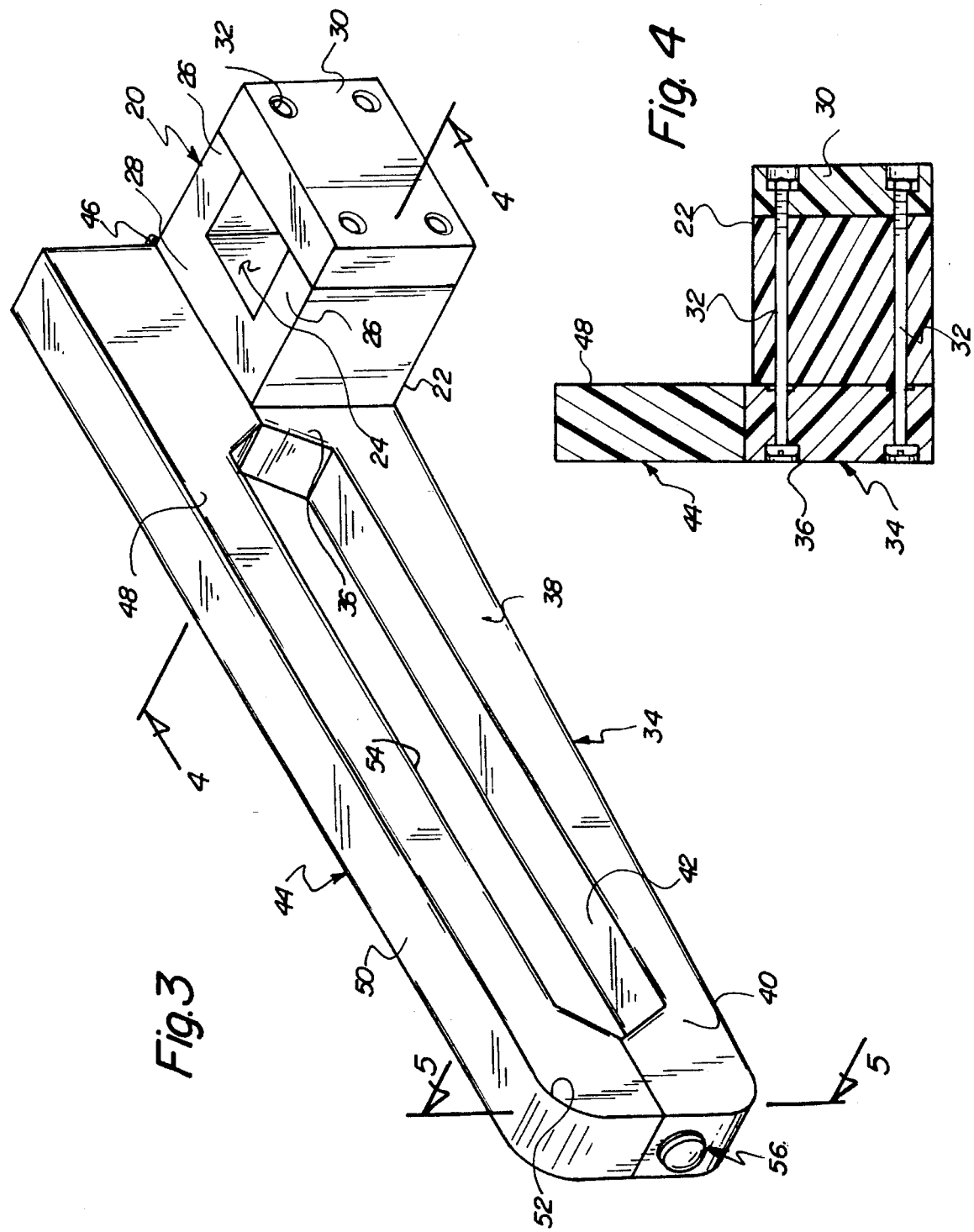

CHAIR CARRIER CLAMPS

This application is a continuation of application Ser. No. 08/260,263 filed on Jun. 14, 1994 now abandoned.

BACKGROUND OF THE INVENTION

1. Field of the Invention

The present invention relates to mounting clamps and more particularly pertains to chair carrier clamps which may be utilized for attaching elongated objects to the vertical supports of a vehicle ladder.

2. Description of the Prior Art

The use of mounting clamps is known in the prior art. More specifically, mounting clamps heretofore devised and utilized for the purpose of coupling objects together are known to consist basically of familiar, expected and obvious structural configurations, notwithstanding the myriad of designs encompassed by the crowded prior art which have been developed for the fulfillment of countless objectives and requirements.

For example, a chair carrier is illustrated in U.S. Pat. No. 4,297,069 for attachment to the rear of a motor vehicle. The device comprises a housing containing to vertical slide bars mounting a cross member therebetween for vertical displacement a pair of rearwardly extending projections mounted on the cross member, and a winch cable attached to cross member to effect motorized vertical movement thereof. The device is particularly suited to engage, lift, and carry a conventionally known wheelchair.

Another patent of interest is U.S. Pat. No. 4,967,942 which teach a lawn chair rack for removable mounting to the rearward bumper of a trailer. The device includes a frame having a plurality of tubular members extending therefrom, with a pair of brackets mounted on the rear bumper of the trailer to receive the lower ends of the frame, such that lawn chairs and the like may be received between the projecting arms.

Other known prior art mounting clamps include U.S. Pat. No. 3,904,161; U.S. Pat. No. 3,848,838; U.S. Pat. No. 4,078,708; and U.S. Pat. No. 3,476,342.

While these devices fulfill their respective, particular objectives and requirements, the aforementioned patents do not disclose chair carrier clamps for attaching elongated objects to the vertical supports of a vehicle ladder which includes a mounting assembly for receiving the vertical support, an elongated lower clamp arm extending orthogonally from the mounting assembly, and an elongated upper clamp arm pivotally coupled to the mounting assembly for latching engagement to the lower arm, with the arms including elongated channels which facilitate a reception of the chair legs or other elongated objects therebetween.

In these respects, the chair carrier clamps according to the present invention substantially departs from the conventional concepts and designs of the prior art, and in so doing provides an apparatus primarily developed for the purpose of attaching elongated objects, such as chairs, ski poles, fishing rods, and the like to the vertical supports of a vehicle ladder.

SUMMARY OF THE INVENTION

In view of the foregoing disadvantages inherent in the known types of mounting clamps now present in the prior art, the present invention provides a new chair carrier clamps construction wherein the same can be utilized for attaching elongated objects to the vertical supports of a vehicle ladder or other structure. As such, the general purpose of the present invention, which will be described subsequently in greater detail, is to provide a new chair carrier clamps apparatus and method which has many of the advantages of the mounting clamps mentioned heretofore and many novel features that result in a chair carrier clamps which is not anticipated, rendered obvious, suggested, or even implied by any of the prior art mounting clamps, either alone or in any combination thereof.

To attain this, the present invention generally comprises clamps for attaching elongated objects, such as chairs, ski poles, fishing rods, and the like, to the vertical supports of a vehicle ladder. The inventive device includes a mounting assembly which receives the vertical support, with an elongated lower clamp arm extending orthogonally from the mounting assembly. An elongated upper clamp arm is pivotally coupled to the mounting assembly for latching engagement to the lower arm. The arms include elongated channels which facilitate a reception of the chair legs or other elongated objects therebetween.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new chair carrier clamps apparatus and method which has many of the advantages of the mounting clamps mentioned heretofore and many novel features that result in a chair carrier clamps which is not anticipated, rendered obvious, suggested, or even implied by any of the prior art mounting clamps, either alone or in any combination thereof.

It is another object of the present invention to provide a new chair carrier clamps which may be easily and efficiently manufactured and marketed.

It is a further object of the present invention to provide a new chair carrier clamps which is of a durable and reliable construction.

An even further object of the present invention is to provide a new chair carrier clamps which is susceptible of a low cost of manufacture with regard to both materials and labor, and which accordingly is then susceptible of low prices of sale to the consuming public, thereby making such chair carrier clamps economically available to the buying public.

Still yet another object of the present invention is to provide a new chair carrier clamps which provides in the apparatuses and methods of the prior art some of the advantages thereof, while simultaneously overcoming some of the disadvantages normally associated therewith.

Still another object of the present invention is to provide chair carrier clamps for attaching elongated objects, such as chairs, ski poles, fishing rods, and the like, to the vertical supports of a vehicle ladder or other structure.

Yet another object of the present invention is to provide chair carrier clamps which each include a mounting assembly for receiving the vertical support of a vehicle ladder or other structure, an elongated lower clamp arm extending orthogonally from the mounting assembly, and an elongated upper clamp arm pivotally coupled to the mounting assembly for latching engagement to the lower arm, with the arms each including elongated channels which facilitate a reception of the chair legs or other elongated objects therebetween.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged isometric illustration of a single chair carrier clamp.

FIG. 4 is a cross sectional view taken along line 4—4 of FIG. 3.

DESCRIPTION OF THE PREFERRED EMBODIMENT

Figure 1:
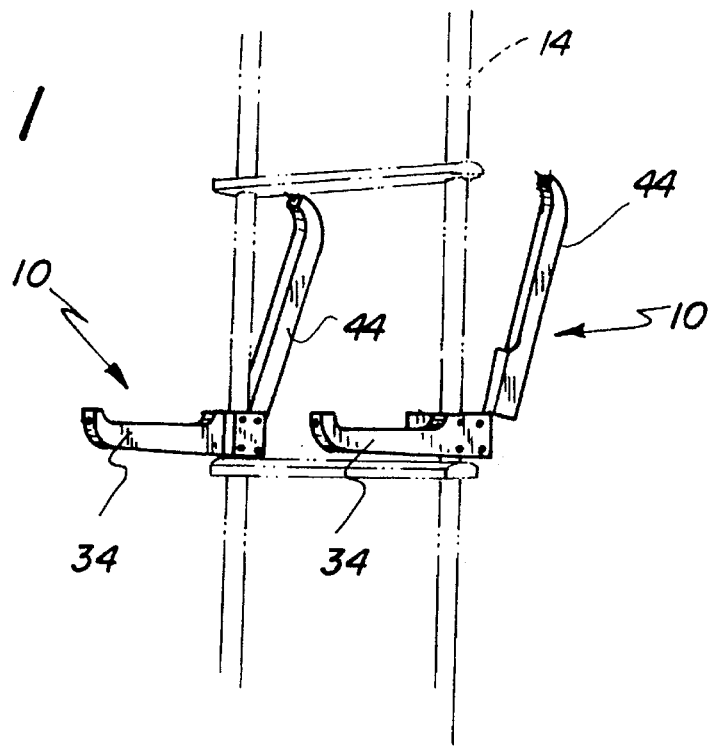
FIG. 1 is an isometric illustration of a pair of chair carrier clamps comprising the present invention as installed on the vertical supports of a vehicle ladder.

With reference now to the drawings, and in particular to FIGS. 1–6 thereof, new chair carrier clamps embodying the principles and concepts of the present invention and generally designated by the reference numeral 10 will be described.

Figure 2:
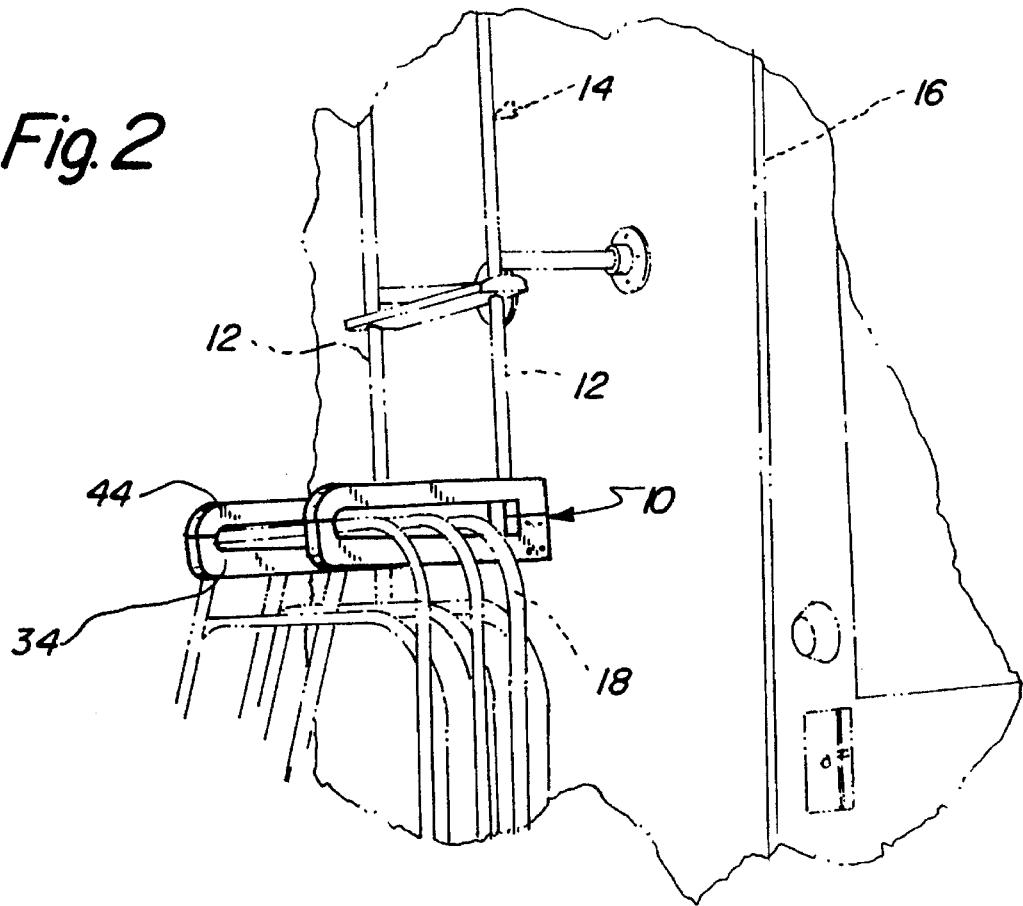
FIG. 2 is a further isometric illustration of the present invention in use.

More specifically, it will be noted that the chair carrier clamps 10 of the present invention are attachable to the vertical supports 12 of a vehicle ladder 14 or other similar structure commonly found on a vehicle 16, such as a van, recreational vehicle or the like, as shown in FIGS. 1 and 2. The clamps 10 are preferably utilized in pairs to receive the legs 18 of a plurality of chairs, as illustrated in FIG. 2, as well as a variety of elongated objects such as skis, ski poles, fishing rods, tent poles, or the like.

As best illustrated in FIGS. 3 and 4 of the drawings, each of the chair carrier clamps 10 comprises a mounting means 20 which facilitates attachment of the clamp to the vertical support 12. To this end, the mounting means 20 comprises a mounting block 22 having a mounting aperture 24 extending vertically therethrough so as to define the substantially U-shape of the mounting block, including opposed side walls 26 which orthogonally project from a mounting block base 28. The mounting aperture 24, as defined by the parallel spacing of the side walls 26, is configured to receive the vertical support 12 of the ladder 14 therethrough. A plate 30 is removably coupled to outer distal ends of both of the side walls 26 by a plurality of threaded fasteners 32 which extend through both the plate and the side walls, as best illustrated in FIG. 4. The plate 30 is operable to capture the vertical support 12 within the mounting aperture 24 of the mounting block 22 and preferably operable to provide clamping pressure against the vertical support 12 between the base 28 and the plate 30, whereby sliding and rotation of the mounting block 22 relative to the vertical support are substantially precluded.

Projecting orthogonally from the base 28 of the mounting block 22 is a lower clamp arm 34 which is coupled to the mounting block 22 by the threaded fasteners 32 which pass through the plate 30, the mounting block, and the lower clamp arm as illustrated in FIG. 4. By this structure, the mounting block 22, as well as the plate 30 may be attached to either side of the lower clamp arm 34. Thus, the chair carrier clamps 10 may be attached to either of the vertical supports 12 of the ladder 14, as illustrated in FIGS. 1 and 2. The lower clamp arm 34 comprises a lower proximal member 36 through which the threaded fasteners 32 project. Integrally or otherwise fixedly secured to the lower proximal member 36 is a lower medial member 38 which extends therefrom and terminates in a lower distal member 40. The lower medial member 38 is shaped so as to define a lower arm channel 42 extending along the lower medial member and positioned between both the lower proximal member 36 and the lower distal member 40.

The present invention 10 further comprises an upper clamp arm 44 which is pivotally coupled to the lower proximal member 36 of the lower clamp arm 34 by a hinge 46, as illustrated in FIG. 3. The upper clamp arm 44 comprises an upper proximal member 48, with an upper medial member 50 integrally or otherwise fixedly secured to the upper proximal member and extending therefrom to terminate in an upper distal member 52. The upper clamp arm 44 is configured substantially similar relative to the lower clamp arm 34, and similarly includes an upper arm channel 54 extending along and defined by the upper medial member 50 between the upper proximal member 48 and the upper distal member 52. The upper clamp arm 44 is pivotally mounted by the hinge 46 so as to engage the lower clamp arm 34 such that the lower arm channel 42 and the upper arm channel 54 are positioned in a facing relationship to receive the chair leg 8 or other elongated object therebetween.

Figure 5:
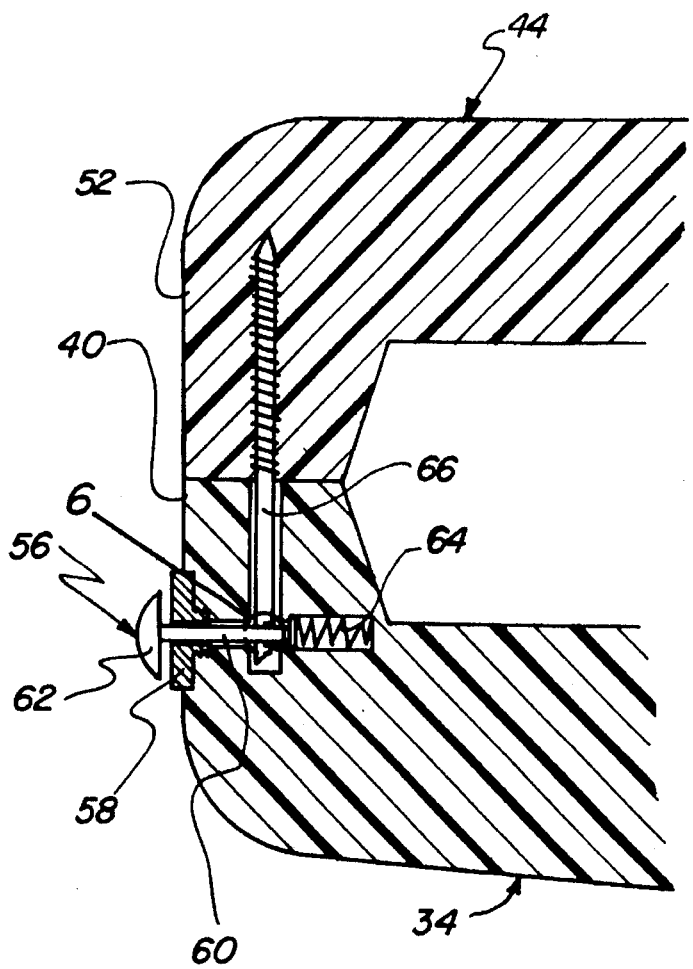
FIG. 5 is a further cross sectional view taken along line 5—5 of FIG. 3.
Figure 6:
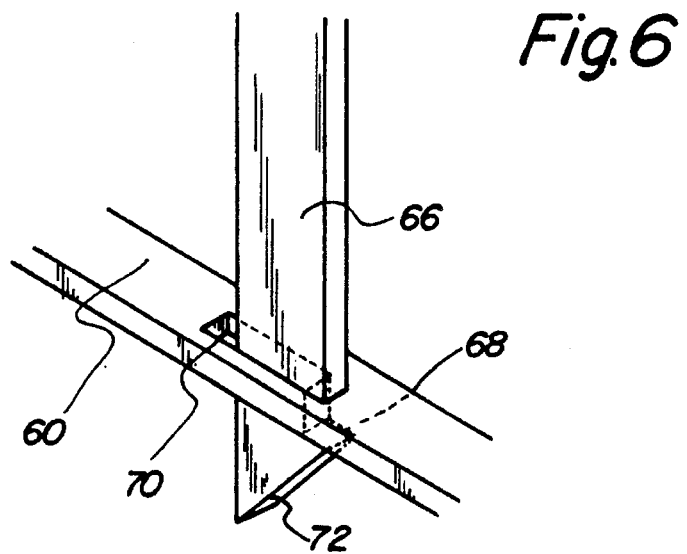
FIG. 6 is an enlarged isometric illustration of the area set forth in FIG. 5.

To secure the upper clamp arm 44 relative to the lower clamp arm 34, a latch means 56 is provided within the lower distal member 40 of the lower clamp arm. As best illustrated in FIGS. 5 and 6 of the drawings, the latch means 56 comprises a sealing bearing 58 which slidably mounts a latch member 60 within a horizontal bore of the lower distal member 40. A button 62 is coupled to the latch member 60 and positioned exteriorly of the sealing bearing 58 to receive manual manipulation of the latch member against the force of a return spring 64. The lower distal member 40 is further shaped so as to define an unlabelled vertical bore which intersects the horizontal bore through which the latch member 60 projects. A latch stud 66 is coupled to the upper distal member 52 of the upper clamp arm 44 and arranged to project into the vertical bore of the lower clamp arm 34 when the arms are positioned together. As best illustrated in FIG. 6, the latch stud 66 includes a detent notch 68 formed therein which removably captures a portion of the latch member 60 when the latch stud is positioned through a latch member aperture 70 in the latch member. To this end, the latch stud 66 includes a tapered tip 72 which causes an orthogonal translation of the latch member 60 in a first direction relative to the latch stud 66 as the latch stud is projected through the latch member 70, whereby the return spring 64 causes an orthogonal translation of the latch member in a second direction relative to the latch stud to engage latch member into the detent notch 68, as illustrated in FIG. 6. Thus, to release the upper clamp arm 44 from the lower clamp arm 34, the button 62 may be manually biased against a force of the spring 64 to move the latch member 60 in the orthogonal first direction relative to the latch stud 66, thereby releasing the latch member 60 from the detent notch 68 to permit removal of the latch stud from within the latch member aperture 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new chair carrier clamp comprising:

a mounting means for mounting to a vertical support;

a lower clamp arm projecting from said mounting means, said lower clamp arm having a lower arm channel extending there along, said lower clamp arm being reversibly mounted to said mounting means;

an upper clamp arm pivotally mounted to said lower clamp arm, said upper clamp arm having an upper arm channel extending there along, the upper clamp arm being pivotally mounted to said lower clamp arm such that when the upper clamp arm is pivoted into engagement with the lower clamp arm, the lower arm channel and the upper arm channel are positioned in a facing relationship so as to receive an elongated object therebetween; and, latch means for releasable coupling said upper clamp arm to said lower clamp arm, said latch means comprising a sealing bearing mounted to a lower distal member, said bearing slidably mounting a latch member having a latch member aperture within a horizontal bore of the lower distal member, a button coupled to the latch member and positioned exteriorly of the lower distal member, a return spring positioned within said horizontal bore and engaged to said latch member, with the lower distal member having a vertical bore which intersects the horizontal bore, a latch stud coupled to an upper distal member of the upper clamp arm and configured to project into the vertical bore of the lower clamp arm when the arms are positioned together, the latch stud including a detent notch formed therein which removably captures a portion of the latch member when the latch stud is positioned through the latch member aperture in the latch member, said latch stud further including a tapered tip which causes an orthogonal translation of the latch member in a first direction relative to the latch stud as the latch stud is projected through the latch member, whereby the return spring causes an orthogonal translation of the latch member in a second direction relative to the latch stud to engage the latch member into the detent notch.

2. The new chair carrier clamp of claim 1, wherein said lower clamp arm comprises a lower proximal member, a lower medial member fixedly secured to the lower proximal member, the lower medial member extending therefrom and terminating in the lower distal member, with the lower medial member being shaped so as to define the lower arm channel extending along the lower medial member and positioned between both the lower proximal member and the lower distal member, and further wherein said upper clamp arm comprises an upper proximal member pivotally coupled to the lower proximal member of the lower clamp arm, an upper medial member fixedly secured to the upper proximal member, the upper medial member extending therefrom and terminating in the upper distal member, with an upper medial member being shaped so as to define an upper arm channel extending along the upper medial member and positioned between both the upper proximal member and the upper distal member.

3. A new chair carrier clamp comprising:

a mounting block having a mounting aperture extending vertically therethrough, said mounting block including opposed side walls orthogonally projecting from a mounting block base, with the mounting aperture being defined between the side walls, said mounting aperture being operable to receive a vertical support;

a plate for engagement to outer distal ends of both of the side walls of the mounting block;

a plurality of threaded fasteners extending through both the plate and the side walls, whereby the plate is operable to capture the vertical support within the mounting aperture of the mounting block and provide clamping pressure against the vertical support between the base and the plate;

a lower clamp arm protecting orthogonally from the mounting block, said lower clamp arm being coupled to the mounting block by the threaded fasteners which pass through the plate and the mounting block, said lower clamp arm comprising a lower proximal member through which the threaded fasteners project, a lower medial member fixedly secured to the lower proximal member, the lower medial member extending therefrom and terminating in a lower distal member, with the lower medial member being shaped so as to define a lower arm channel extending along the lower medial member and positioned between both the lower proximal member and the lower distal member;

an upper clamp arm, said upper clamp arm comprising an upper proximal member pivotally coupled to the lower proximal member of the lower clamp arm, an upper medial member fixedly secured to the upper proximal member, the upper medial member extending therefrom and terminating in an upper distal member, with the upper medial member being shaped so as to define an upper arm channel extending along the upper medial member and positioned between both the upper proximal member and the upper distal member, the upper clamp arm being pivotally mounted to said lower clamp arm such that when the upper clamp arm is pivoted into engagement with the lower clamp arm, the lower arm channel and the upper arm channel are positioned in a facing relationship so as to receive an elongated object therebetween; and, a latch means for securing the upper clamp arm relative to the lower clamp arm, said latch means comprising a sealing bearing mounted to said lower distal member, said bearing slidably mounting a latch member having a latch member aperture within a horizontal bore of the lower distal member, a button coupled to the latch member and positioned exteriorly of the lower distal member, a return spring positioned within said horizontal bore and engaged to said latch member, with the lower distal member having a vertical bore which intersects the horizontal bore, a latch stud coupled to the upper distal member of the upper clamp arm and configured to project into the vertical bore of the lower clamp arm when the arms are positioned together, the latch stud including a detent notch formed therein which removably captures a portion of the latch member when the latch stud is positioned through the latch member aperture in the latch member, said latch stud further including a tapered tip which causes an orthogonal translation of the latch member in a first direction relative to the latch stud as the latch stud is projected through the latch member, whereby the return spring causes an orthogonal translation of the latch member in a second direction relative to the latch stud to engage latch member into the detent notch.

4. A chair carrier clamp comprising:
(a) a lower clamp arm having a lower arm channel extending there along and including mounting means for mounting said clamp to a vertical support;

(b) an upper clamp arm and means pivotally mounting said upper clamp arm to said lower clamp arm such that when said upper clamp arm is pivoted into engagement with said lower clamp arm, said lower arm channel and said upper clamp arm are positioned in a facing relationship so as to receive an elongated object therebetween; and (c) latch means for releasably coupling said upper clamp arm to said lower clamp arm, said latch means comprising:
(1) a latch member mounted on one of said upper and lower clamp arms and including locking means having a first latch engaging surface and including means permitting movement relative to said one of said upper and lower clamp arms between a latched position and an unlatched position,
(2) coil spring biasing means arranged to bias said locking means, including said first latch engaging surface, towards said latched position, and
(3) means providing a second latch engaging surface on the other of said upper and lower clamp arms;
(4) said first and second latch engaging surfaces being arranged such that, when said upper clamp arm is pivoted into engagement with said lower clamp arm, said first latch engaging surface on said locking means of said latch member on said one of said upper and lower clamp arms biases toward said latched position, releasably engaging said second latch engaging surface on said other of said upper and lower clamp arms, and, when pressure is applied to said latch means in a direction opposite to the direction of the bias of said coil spring biasing means to move said first latch engaging surface on said locking means to said unlatched position, said first latch engaging surface disengages said second latch engaging surface to permit said upper clamp arm to be pivoted away from said lower clamp arm.

5. The chair carrier clamp of claim 4, wherein said upper clamp arm has an upper arm channel extending therealong which confronts said lower arm channel when said upper clamp arm is pivoted into engagement with said lower clamp arm.

6. The chair carrier clamp of claim 4, wherein said latch member is arranged on one of said upper and lower clamp arms such that said locking means having said first latch engaging surface moves between said latched and unlatched positions along a path essentially orthogonal to the axis of said pivot means.

7. The chair carrier clamp of claim 4, wherein one of said upper and lower clamp arms further comprises a projection and the other of said upper and lower clamp arms comprises a complementary recess, said projection and recess being arranged such that, when said upper clamp arm is pivoted into engagement with said lower clamp arm, said projection is received in said recess.

* * * * *